United States Patent
Endou et al.

(10) Patent No.: US 9,594,357 B2
(45) Date of Patent: Mar. 14, 2017

(54) THERMAL DISPLACEMENT COMPENSATING DEVICE OF MACHINE TOOL

(71) Applicant: FANUC CORPORATION, Yamanashi (JP)

(72) Inventors: Takahiro Endou, Yamanashi (JP); Susumu Maekawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 668 days.

(21) Appl. No.: 14/025,389

(22) Filed: Sep. 12, 2013

(65) Prior Publication Data

US 2014/0074299 A1 Mar. 13, 2014

(30) Foreign Application Priority Data

Sep. 13, 2012 (JP) ................................. 2012-201343

(51) Int. Cl.
*G05B 13/02* (2006.01)
*G05B 19/404* (2006.01)

(52) U.S. Cl.
CPC .......... *G05B 13/02* (2013.01); *G05B 19/404* (2013.01); *G05B 2219/37555* (2013.01); *G05B 2219/49207* (2013.01)

(58) Field of Classification Search
None
See application file for complete search history.

(56) References Cited

U.S. PATENT DOCUMENTS

| 6,535,787 B1* | 3/2003 | Inamasu | G05B 19/409 700/180 |
| 2002/0004688 A1 | 1/2002 | Kojima et al. | |
| 2012/0038763 A1 | 2/2012 | Kawada et al. | |

FOREIGN PATENT DOCUMENTS

| CN | 102414613 A | 4/2012 |
| JP | 5116053 A | 5/1993 |
| JP | 1039912 A | 2/1998 |
| JP | 11-090779 A | 4/1999 |
| JP | 2002-018677 A | 1/2002 |
| JP | 2008105119 A | 5/2008 |

(Continued)

OTHER PUBLICATIONS

Office Action issued May 6, 2015, corresponding to Chinese patent application No. 201310415476.7.

(Continued)

*Primary Examiner* — Mohammad Ali
*Assistant Examiner* — Saad M Kabir
(74) *Attorney, Agent, or Firm* — Hauptman Ham, LLP

(57) ABSTRACT

A position command value is compensated by predicting a thermal displacement amount of each part of a machine tool and adding a thermal displacement compensation amount which cancels the predicted thermal displacement amount to the position command value of a feed axis. This thermal displacement compensation amount is adjusted from the error amount between this compensated position command value and an actual machining point. Upon adjustment of this thermal displacement compensation amount, it is possible to determine whether to increase or decrease the thermal displacement amount based on a direction in which an operator moves a tool image or a workpiece image on a screen.

9 Claims, 6 Drawing Sheets

(56) References Cited

FOREIGN PATENT DOCUMENTS

| | | |
|---|---|---|
| JP | 2008114322 A | 5/2008 |
| JP | 2010188505 A | 9/2010 |
| JP | 2012213840 A | 11/2012 |

OTHER PUBLICATIONS

Decision to Grant a Patent mailed Aug. 5, 2014, corresponding to Japanese patent application No. 2012-201343.
Office Action mailed Apr. 15, 2014, corresponds to Japanese patent application No. 2012-201343.

* cited by examiner

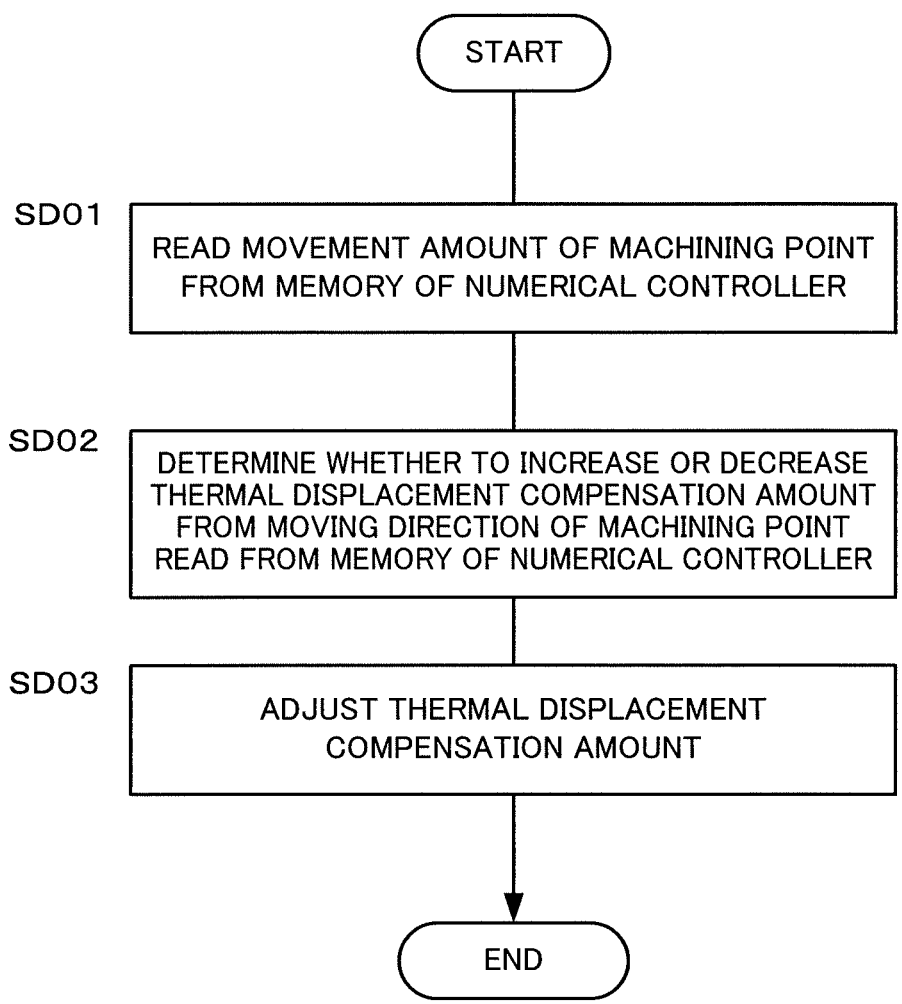

THERMAL DISPLACEMENT COMPENSATING DEVICE OF MACHINE TOOL

RELATED APPLICATIONS

The present application is based on, and claims priority from, Japanese Application Number 2012-201343, filed Sep. 13, 2012, the disclosure of which is hereby incorporated by reference herein in its entirety.

BACKGROUND OF THE INVENTION

Field of the Invention

The present invention relates to a thermal displacement compensation device of a machine tool which improves working efficiency upon adjustment of the amount of thermal displacement compensation amount.

Description of the Related Art

In some cases, a function of calculating and compensating a thermal displacement amount from, for example, an operation of a machine tool or a temperature of each part cannot more accurately calculate the thermal displacement amount due to surrounding environment such as a coolant or an outside air temperature, and therefore an error (compensation error) between the thermal displacement compensation amount and an actual thermal displacement amount becomes significant, and the thermal displacement amount cannot be accurately compensated. In general, when the compensation error becomes significant due to an external factor, compensation precision is improved by adjusting the thermal displacement compensation amount by increasing or decreasing the thermal displacement compensation amount.

As a first example of a method of adjusting a thermal displacement compensation amount, Japanese Patent Application Laid-Open No. 2002-18677 discloses a method of adjusting a thermal displacement compensation amount, when a calculated thermal displacement compensation amount is significantly different from an actual thermal displacement amount due to an external factor, by newly calculating a coefficient related to heat generated by spindle rotation and axis movement in a thermal displacement calculation equation based on the thermal displacement compensation amount stored in a controller of a machine tool and a compensation error.

Upon adjustment of the thermal displacement compensation amount, sections obtained by dividing an entire length of a feed screw which forms a feed axis portion into a plurality of sections are set, and a thermal displacement amount $\delta_{nI}$ of a section I at a time n is calculated according to following equation (1).

$$\delta_{nI} = \delta_{(n-1)I} + A \times v_{nI} - B_{nI} + D_{nI} \quad (1)$$

A: Heat generation coefficient $v_{nI}$: Value calculated from axis moving speed at time n $B_{nI}$: Contraction due to heat dissipation of feed axis per unit time in section I $D_{nI}$: Displacement due to heat conduction from a section adjacent to section I A feed axis portion thermal displacement amount $L_{nX}$ in a section X at the time n is calculated by adding the thermal displacement amount in each section from a reference position to the section X as in following equation (2).

$$L_{nX} = \delta_{n0} + \delta_{n1} + \ldots + \delta_{nI} + \ldots + \delta_{nX} \quad (2)$$

$L_{nX}$: Feed axis portion thermal displacement amount in section X at time n

When the heat generation coefficient A increases, the thermal displacement compensation amount increases, and, when the heat generation coefficient A decreases, the thermal displacement compensation amount decreases. Focusing on this, the heat generation coefficient A is calculated again using following equation (3) based on a compensation error (adjustment value $\epsilon$) set and a value (T) calculated from the thermal displacement compensation amount at a time at which the compensation error is produced upon adjustment of the thermal displacement compensation amount.

$$A' = A \times (1 + \epsilon \times T) \quad (3)$$

In this case, whether to increase or decrease the coefficient A (to increase or decrease the thermal displacement compensation amount) is determined based on a sign of the adjustment value $\epsilon$, and an increase amount of the heat generation coefficient A (a movement amount of a machining point) is determined based on an absolute value of the adjustment value $\epsilon$.

Further, as a second example of a method of adjusting a thermal displacement compensation amount, Japanese Patent Application Laid-Open No. 11-90779 discloses a method of changing and adjusting a thermal displacement compensation amount by adding or subtracting an adjustment value to or from the calculated thermal displacement compensation amount.

According to the methods of adjusting thermal displacement compensation amounts disclosed in above Japanese Patent Application Laid-Open No. 2002-18677 and Japanese Patent Application Laid-Open No. 11-90779, two elements of "increase or decrease of a thermal displacement compensation amount (a sign of an adjustment value)" and "movement amount of a machining point (an absolute value of an adjustment value)" are set.

However, a thermal displacement compensation amount represents the amount of extension of a feed axis not the movement amount of a machining point on a machine coordinate and, therefore, the sign does not match with the machine coordinate in some cases, and a fixed end of the axis and a direction of a machine coordinate differ depending on a machine tool or an axis. Hence, a thermal displacement compensation amount is compensated by adding a position command value to the thermal displacement compensation amount in some cases and a thermal displacement compensation amount is compensated by subtracting a position command value from the thermal displacement compensation amount, and therefore compensation is hardly performed adequately. As a result, adjustment of a thermal displacement compensation amount is insufficient, and therefore "increase or decrease of a thermal displacement compensation amount" does not match a moving direction of a machining point (a position at which a work is machined by a tool) and then a wrong setting is made upon a setting of adjustment of the thermal displacement compensation amount and, as a result, the thermal displacement compensation amount is decreased when the thermal displacement compensation amount needs to be increased and the thermal displacement compensation amount is increased when the thermal displacement compensation amount need to be decreased.

SUMMARY OF THE INVENTION

It is therefore an object of the present invention to provide a thermal displacement compensation device of a machine tool which enables a function of predicting a thermal displacement amount from, for example, an operation of the machine tool and a temperature of each part and compensating the thermal compensation amount to reduce an error of a setting of adjustment of the thermal displacement compensation amount upon adjustment of the thermal displacement compensation amount in order to reduce a compensation error, and accurately increase the thermal displacement compensation amount when the thermal displacement compensation amount needs to be increased and decrease the thermal displacement compensation amount when the thermal displacement compensation amount needs to be decreased.

The present invention displays an image which is moved by an operator's operation on a display device of a controller, decides whether to increase or decrease a thermal displacement compensation amount from a direction in which the operators moves the image and adjusts the thermal displacement compensation amount in the right direction.

A thermal displacement compensation device of a machine tool according to the present invention includes: a thermal displacement compensating unit which compensates a position command value by predicting a thermal displacement amount from an operation of a machine or a temperature of each part of the machine and adding a thermal displacement compensation amount which cancels the predicted thermal displacement amount to the position command value of a feed axis; a thermal displacement compensation amount adjusting unit which adjusts the thermal displacement compensation amount from an error amount between the position command value compensated by the thermal displacement compensating unit and an actual machining point; an image display device which displays an image of a workpiece or a tool; an image operating unit which moves the image of workpiece or tool in a direction to cancel the error amount of the machining point; a moving direction display unit which displays on the image display device an image which shows a relationship between a position of an image of which thermal displacement compensation amount has not yet been adjusted and a position of an image which has moved by the image operating unit; a thermal displacement compensation amount increase/decrease determining unit which determines an increase or a decrease of the thermal displacement compensation amount based on a direction in which the image is moved from an initial position by operating the image operating unit; and an error amount setting unit which sets an error amount of the machining point. The thermal displacement compensation amount adjusting unit adjusts the thermal displacement compensation amount based on the increase or decrease of thermal displacement compensation amount determined by the thermal displacement compensation amount increase/decrease determining unit and the error amount of the machining point set by the error amount setting unit.

The error amount setting unit may set the error amount of the machining point according to an input from an inputting means, or calculate and set the error amount of the machining point from a movement amount of the image.

The present invention can provide a thermal displacement compensation device of a machine tool which enables a function of predicting a thermal displacement amount from, for example, an operation of the machine tool and a temperature of each part and compensating the thermal compensation amount to reduce an error of a setting of adjustment of the thermal displacement compensation amount upon adjustment of the thermal displacement compensation amount in order to reduce a compensation error, and accurately increase the thermal displacement compensation amount when the thermal displacement compensation amount needs to be increased and decrease the thermal displacement compensation amount when the thermal displacement compensation amount needs to be decreased.

BRIEF DESCRIPTION OF THE DRAWINGS

The forgoing and other objects and feature of the invention will be apparent from the following description of preferred embodiments of the invention with reference to the accompanying drawings, in which:

FIG. 7 is a flowchart for explaining that the setting of adjustment of the thermal displacement compensation amount is reflected in the thermal displacement compensation amount.

DETAILED DESCRIPTION OF THE PREFERRED EMBODIMENTS

Figure 1:
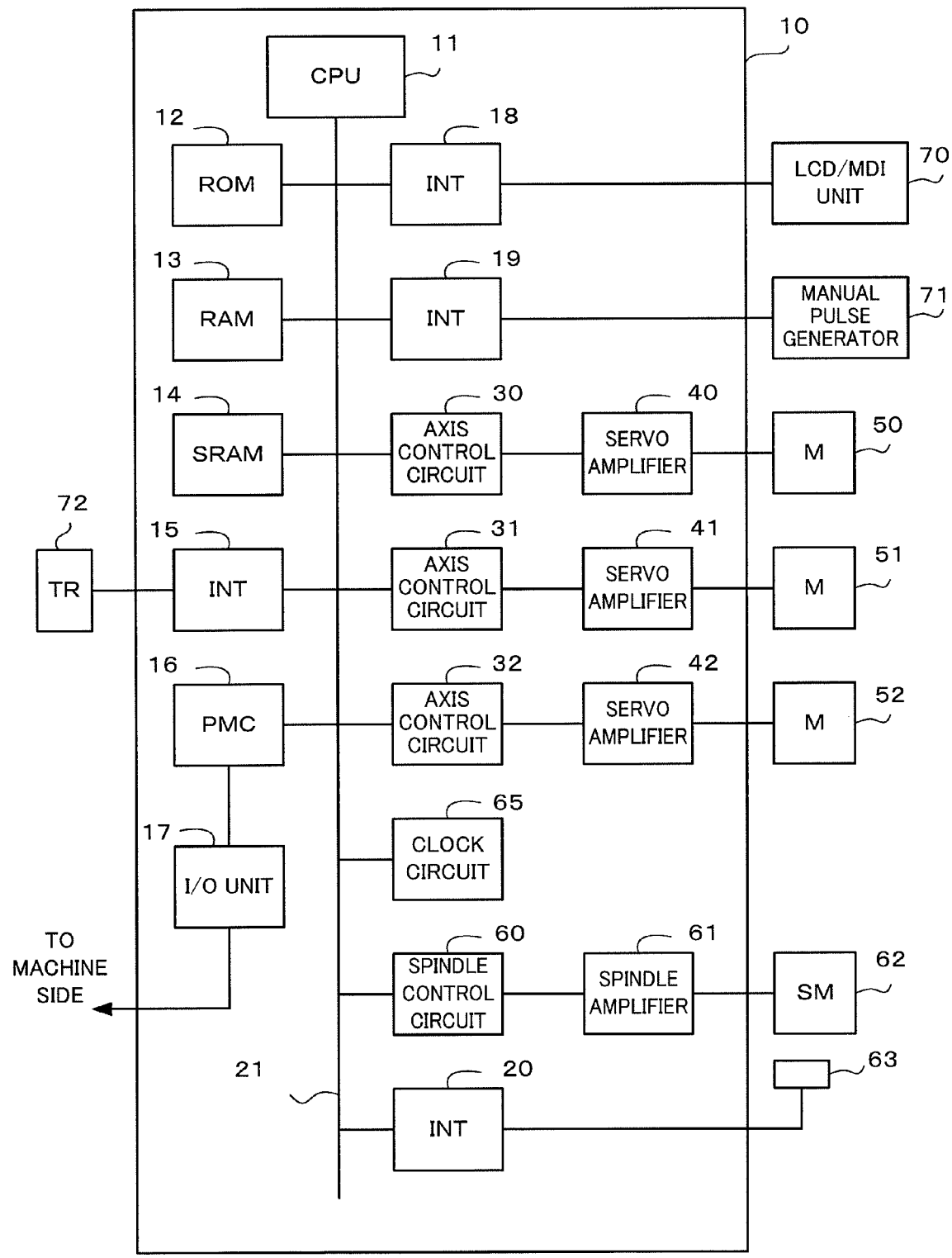
FIG. 1 is a block diagram illustrating an outline of a numerical controller which controls a machine tool.

A thermal displacement compensation device of a machine tool according to the present invention is formed by a numerical controller which controls the machine tool. An outline of this numerical controller will be described using a block diagram of FIG. 1.

A processor (CPU) 11 of a numerical controller 10 reads a system program stored in a ROM 12 through a bus 21, and entirely controls the numerical controller 10 according to this system program. An LCD/MDI unit 70 is a manual input device with a display device, and displays on this display device (a liquid crystal display device LCD) a display example illustrated in FIG. 2 or 3. This LCD/MDI unit 70 has a function of moving a display position of a display image illustrated in FIG. 2 or 3 according to an operator's specific operation (such as a cursor key input, a software key input or a dragging operation) or a function of inputting a numerical value of a movement amount. A RAM 13 stores temporary calculation data, display data and various items of data inputted by the operator through the LCD/MDI unit 70.

A SRAM 14 is configured as a non-volatile memory which is backed up by a battery (not illustrated), and which holds a storage state even when the numerical controller 10 is powered off. This SRAM 14 stores a program of measuring the initial position, a program of compensating thermal displacement of a machine tool, a machining program described below, read through an interface 15 and a machining program inputted through the LCD/MDI unit 70 and the like. Further, in the ROM 12, various system programs for executing processing of an edition mode required to create and edit the machining program and processing of an automatic operation are loaded in advance.

The interface 15 is an interface for an external device which can connect to the numerical controller 10, and is connected with an external device 72 such as an external storage device. For example, a machining program and a thermal displacement measuring program are read from the external storage device. A programmable machine controller (PMC) 16 controls, for example, an auxiliary device of a machine tool based on a sequence program built in the numerical controller 10. That is, by means of an M function, an S function and a T function commanded by a machining program, a necessary signal is converted in the auxiliary device according to these sequence programs, and the converted signal is outputted from an I/O unit 17 to the auxiliary device. According to this output signal, the auxiliary device such as various actuators operates. Further, signals received from various switches of an operation panel arranged in a main body of the machine tool are subjected to necessary processing, and passed to the processor 11.

Image signals such as a current position of each axis of the machine tool, an alarm, a parameter and image data are sent to the LCD/MDI unit 70, and are displayed on this display. The LCD/MDI unit 70 is a manual data input device which has a display, a keyboard and the like, and an interface 18 receives data from the keyboard of the LCD/MDI unit 70 and passes the data to the processor 11.

An interface 19 is connected to a manual pulse generator 71, and the manual pulse generator 71 is implemented on the operation panel of the machine tool and is used to precisely position a movable portion of the machine tool by controlling each axis by a distributed pulse based on a manual operation. X and Y axis control circuits and Z axis control circuit 30 to 32 which move a table T of the machine tool receive a movement command of each axis from the processor 11, and output the command of each axis to servo amplifiers 40 to 42. The servo amplifiers 40 to 42 receive this command, and drive servo motors 50 to 52 of each axis of the machine tool. Position detecting detectors are built in the servo motors 50 to 52 of each axis, and position signals from these detectors are fed back as a pulse train.

A spindle control circuit 60 receives a spindle rotation command to the machine tool, and outputs a spindle speed signal to a spindle amplifier 61. The spindle amplifier 61 receives this spindle speed signal, rotates a spindle motor 62 of the machine tool at the commanded rotation speed and drives the tool. The spindle motor 62 is coupled with a position detector 63 by means of a gear, a belt or the like, the position detector 63 outputs a feedback pulse in synchronization with rotation of the spindle and the feedback pulse is read by the processor 11 through an interface 20. A clock circuit 65 is adjusted to synchronize with a current time.

As disclosed in above Japanese Patent Application Laid-Open No. 2002-18677 and Japanese Patent Application Laid-Open No. 11-90779, the numerical controller 10 has a thermal displacement compensating unit which compensates a position command value by predicting a thermal displacement amount from an operation of the machine or the temperature of each part of the machine, and adding a thermal displacement compensation amount which cancels the predicted thermal displacement amount, to a position command value of a feed axis.

The present invention can display an image which is moved by an operator's operation, on the display device of the numerical controller 10 which is the thermal displacement compensation device of the machine tool, decide whether to increase or decrease the thermal displacement compensation amount based on a direction in which the operator moves the image and adjust the thermal displacement compensation amount in a right direction.

A display image displayed on the display device provided in the LCD/MDI unit 70 will be described below.

<In a Case where a Workpiece Image is Moved>

A mode of moving a workpiece image displayed on the image display device provided in the thermal displacement compensation device of the machine tool will be described using FIG. 2.

A workpiece image 102 is displayed on a display screen 100 of the display device (a display device provided in the LCD/MDI unit 70) of the numerical controller 10 which functions as a thermal displacement compensation device of the machine tool. A display position of this workpiece image 102 can be moved in an X axis direction, a Y axis direction and a Z axis direction according to an operator's operation (a cursor key operation, a software key operation, a dragging operation or the like). In addition, the workpiece image 102 displayed on the display screen 100 of the display device only needs to enable recognition of a moving direction of a workpiece to be machined, and therefore only needs to schematically illustrate a workpiece shape.

Figure 2:
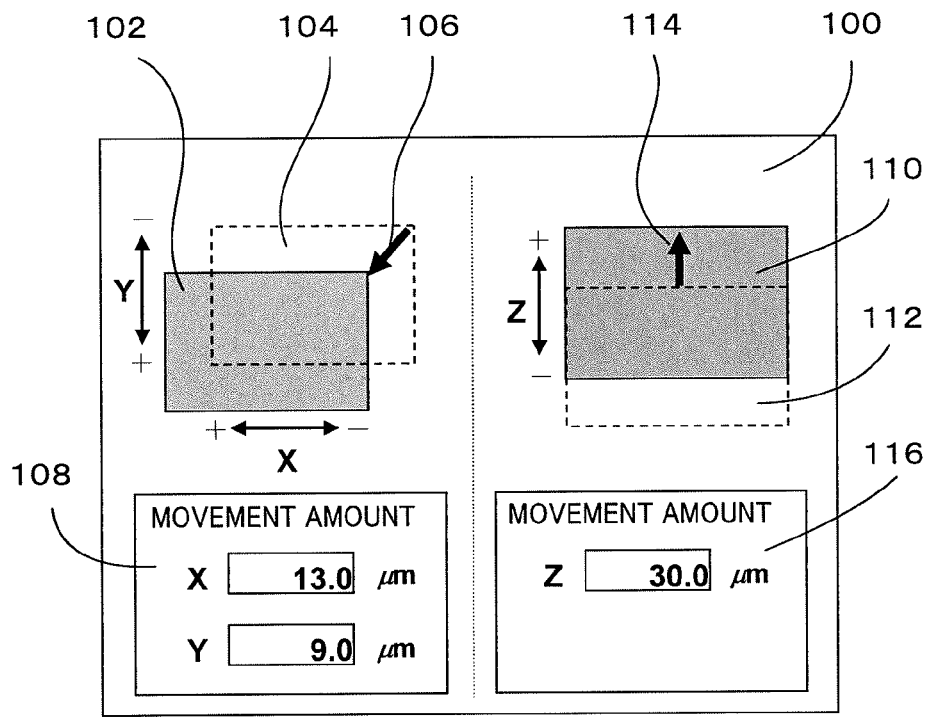
FIG. 2 is a view for explaining that a workpiece image displayed on an image display device provided in a thermal displacement compensation device of the machine tool is moved.

As illustrated in FIG. 2, on the left side of the display screen 100 of the display device, an image is displayed which can clearly show the moving direction of the workpiece image 102 in which the workpiece image 102 has moved in a plane parallel to the X axis and Y axis from the initial position of the workpiece image 104 (indicated by broken lines) of which thermal displacement compensation amount has not yet been adjusted. That is, the workpiece image 102 which has moved and the workpiece image 104 which has not yet moved are displayed on the display screen 100.

Further, an image to be used as an aid in operation, such as a moving direction and a position of a machining point, may be displayed together with these workpiece images 104, 102. For example, the moving direction of the workpiece image 102 may be displayed using an arrow 106.

A sign which represents the moving direction of the workpiece image 102 is determined based on an increase or a decrease in the machine coordinate of a machining point. That is, a moving direction in case where the machining point moves in a positive direction on the machine coordinate is a positive direction, and a moving direction in case where the machining point moves in a negative direction is a negative direction.

Meanwhile, an operator measures a compensation error and moves the workpiece image 102 in a direction where the measured compensation error decreases, based on the definition of the moving direction to move the machining point. More specifically, the operator measures a position which serves as an indicator of a machining point, such as a machining surface of a workpiece or a fixed point on a table, by actually using a measuring device after execution of a machining program, calculates a displacement amount (compensation error) of the machining point and moves the machining point by moving the workpiece image 102 in a plus moving direction when the machining point is to move in the positive direction on the machine coordinate or moving the workpiece image 102 in a minus moving direction when the machining point is to move in the negative direction on the machine coordinate.

As illustrated in FIG. 2, on the right side of the display screen 100 of the display device, an image is displayed which can clearly show the moving direction of a workpiece image 110 in which the workpiece image 110 has moved in a plane parallel to the Z axis from the initial position of the workpiece image 112 (indicated by broken lines) of which thermal displacement compensation amount has not yet been adjusted. That is, a workpiece image 110 which has moved and an image of the workpiece 110 which has not yet moved are displayed on the display screen 100.

Further, an image to be used as an aid in operation, such as a moving direction and a position of a machining point, may be displayed together with these images. For example, the moving direction of the workpiece image 110 may be displayed using an arrow 114.

"increase or decrease of a thermal displacement compensation amount" is determined based on a direction in which the workpiece image 102 is moved. The determining method will be described below.

In addition, although the display screen 100 in FIG. 2 displays the motions of the tool in the X axis direction and the Y axis direction on one image, and displays the motion of the tool in the Z axis direction on another image, the number of axes to be displayed on one image and the moving direction of which axis is to be displayed on this image can be arbitrarily set. Further, although motions of the work in the X axis direction, the Y axis direction and the Z axis direction are simultaneously displayed on the display screen 100 in FIG. 2, only a motion in one axis direction or two axis directions may be displayed.

Further, on the right side and the left side of the display screen 100 in FIG. 2, movement amount display areas 108 and 116 for displaying movement amounts of machining points set or calculated according to a method described below are displayed, respectively.

<In a Case where a Tool Image is Moved>

A mode of moving a tool image displayed on an image display device provided in the thermal displacement compensation device of the machine tool will be described using FIG. 3.

A tool image 122 is displayed on the display screen 100 of the display device (a display device provided in the LCD/MDI unit 70) of the numerical controller 10 which functions as a thermal displacement compensation device of the machine tool. A display position of this tool image can be moved in an X axis direction, a Y axis direction and a Z axis direction according to an operator's operation (a cursor key operation, a software key operation or a dragging operation or the like). In addition, a tool image 122 displayed on the display screen 100 of the display device only needs to enable recognition of a moving direction of a tool used for machining, and therefore only needs to schematically illustrate a tool shape.

Figure 3:
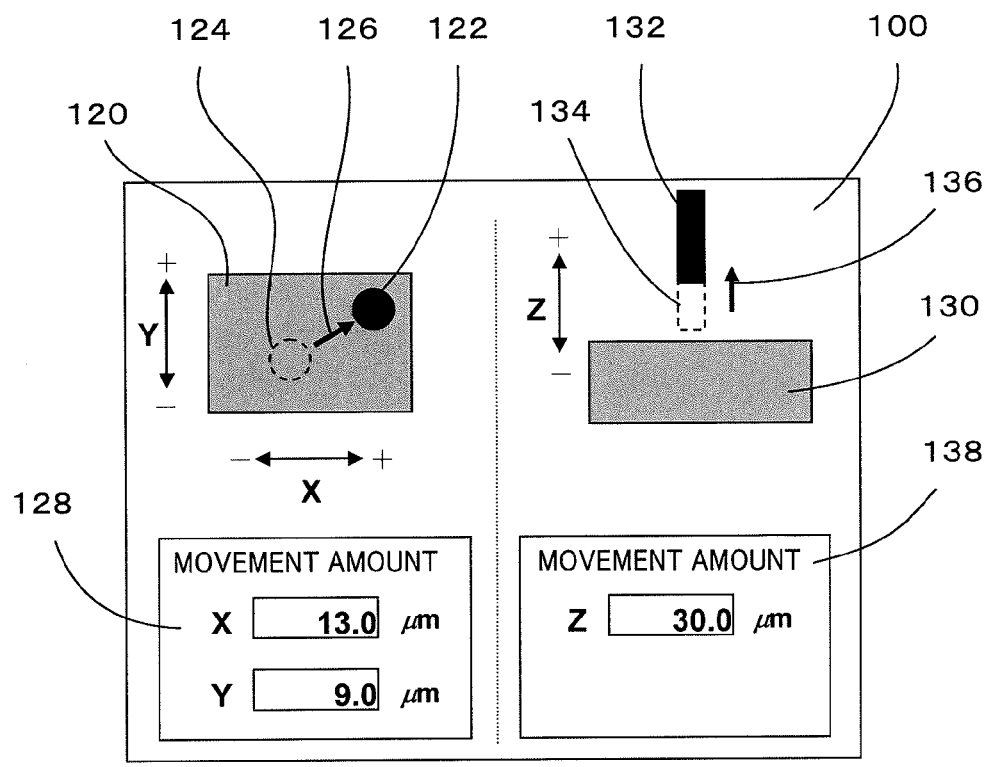
FIG. 3 is a view for explaining that a tool image displayed on the image display device provided in the thermal displacement compensation device of the machine tool is moved.

As illustrated in FIG. 3, on the left side of the display screen 100 of the display device, an image is displayed, in addition to the workpiece image 120, which can clearly show the moving direction of the tool image 122 in which the tool image 122 has moved from the initial position of the tool (a position of the tool image 124 of the workpiece (indicated by broken lines) of which thermal displacement compensation amount has not yet been adjusted). That is, the image 122 of the tool which has moved and the image 124 of the tool which has not yet moved are displayed on the display screen 100.

Further, an image to be used as an aid in operation, such as a moving direction and a position of a machining point, may be displayed together with these images. For example, the moving direction of the workpiece image may be displayed using an arrow 126.

A sign which represents the moving direction of the tool image 122 is determined based on an increase or a decrease of the machine coordinate at a machining point. That is, the moving direction in case where the machining point moves in the positive direction on the machine coordinate is positive direction, and the moving direction in case where the machining point moves in the negative direction is negative direction.

Meanwhile, an operator measures a compensation error and moves the tool image 122 in a direction where the measured compensation error becomes small, based on the definition of the moving direction to move the machining point. More specifically, the operator measures a position which serves as an indicator of the machining point, such as a machining surface of a workpiece or a fixed point on a table, by actually using a measuring device after execution of a machining program, calculates a displacement amount (compensation error) of the machining point and moves the machining point by moving the tool image 122 in a positive direction in case where the machining point is to move in the positive direction on the machine coordinate or in the negative direction in case where the machining point is to move in the negative direction.

In addition, although the display screen 100 in FIG. 3 displays the motions of the tool in the X axis direction and the Y axis direction on one image, and displays the motion of the tool in the Z axis direction on another image, the number of axes to be displayed on one image and the moving direction of which axis is to be displayed on this image can be arbitrarily set. Further, although motions of the work in the X axis direction, the Y axis direction and the Z axis direction are simultaneously displayed on the display screen 100 in FIG. 3, only a motion in one axis direction or two axis directions may be displayed.

Furthermore, on the right side and the left side of the display screen 100 in FIG. 3, movement amount display areas 128 and 138 for displaying movement amounts of machining points set or calculated according to a method described below are displayed, respectively.

"increase or decrease of a thermal displacement compensation amount" is determined based on a direction in which a tool image is moved. The determining method will be described below.

As illustrated in FIG. 3, on the right side of the display screen 100 of the display device, an image is displayed which can clearly show the moving direction of the tool image 132 which has moved in a plane parallel to the Z axis from the initial position of a tool image 134 (indicated by broken lines) of which thermal displacement compensation amount has not yet been adjusted. That is, the tool image 132 which has moved and the tool image 134 which has not yet moved are displayed on the display screen 100. Further, an image to be used as an aid in operation, such as a moving direction and a position of a machining point, may be displayed, in addition to these images. For example, the moving direction of the workpiece image may be displayed using an arrow 136.

In addition, although the prior art disclosed in above Japanese Patent Application Laid-Open No. 2002-18677 (see equation (1) to equation (4)) and the prior art disclosed in Japanese Patent Application Laid-Open No. 11-90779 can be used to adjust the thermal displacement compensation amount, adjusting the thermal compensation amount is not limited to them, and adjustment of the thermal displacement compensation amount performed by increasing or decreasing the calculated thermal displacement compensation amount at a fixed rate (adjustment rate) according to following equation (4) based on "increase or decrease of a thermal displacement compensation amount" and "movement amount of a machining point".

$$E = 1 + d \times L_{adj}/L_E \qquad (4)$$

d: +1 in case of increase of thermal displacement compensation amount and −1 in case of decrease $L_{adj}$: movement amount of machining point $L_E$: compensation amount at time at which compensation error is produced When the thermal displacement compensation amount is adjusted using above equation (4), the operator sets "increase or decrease of a thermal displacement compensation amount d (=+1 or −1)" and "movement amount of a machining point $L_{adj}$", so that it is possible to apply an adjusting method using images to this method.

Next, process of adjusting a thermal displacement compensation amount in a thermal displacement compensation device according to the present invention will be described using FIG. 4.

A machining program is executed using the thermal displacement compensation device of the machine tool (the numerical controller 10 which controls the machine tool) to actually machine a work. A position which serves as an indicator of a machining point, such as a machining surface of a workpiece or a fixed point on the table, is measured using a known measuring device after execution of the program, and a displacement amount (compensation error) of the machining point and a direction in which the machining point is displaced (an increase or a decrease of the thermal displacement compensation amount) are stored in the memory of the numerical controller 10.

Figure 4:
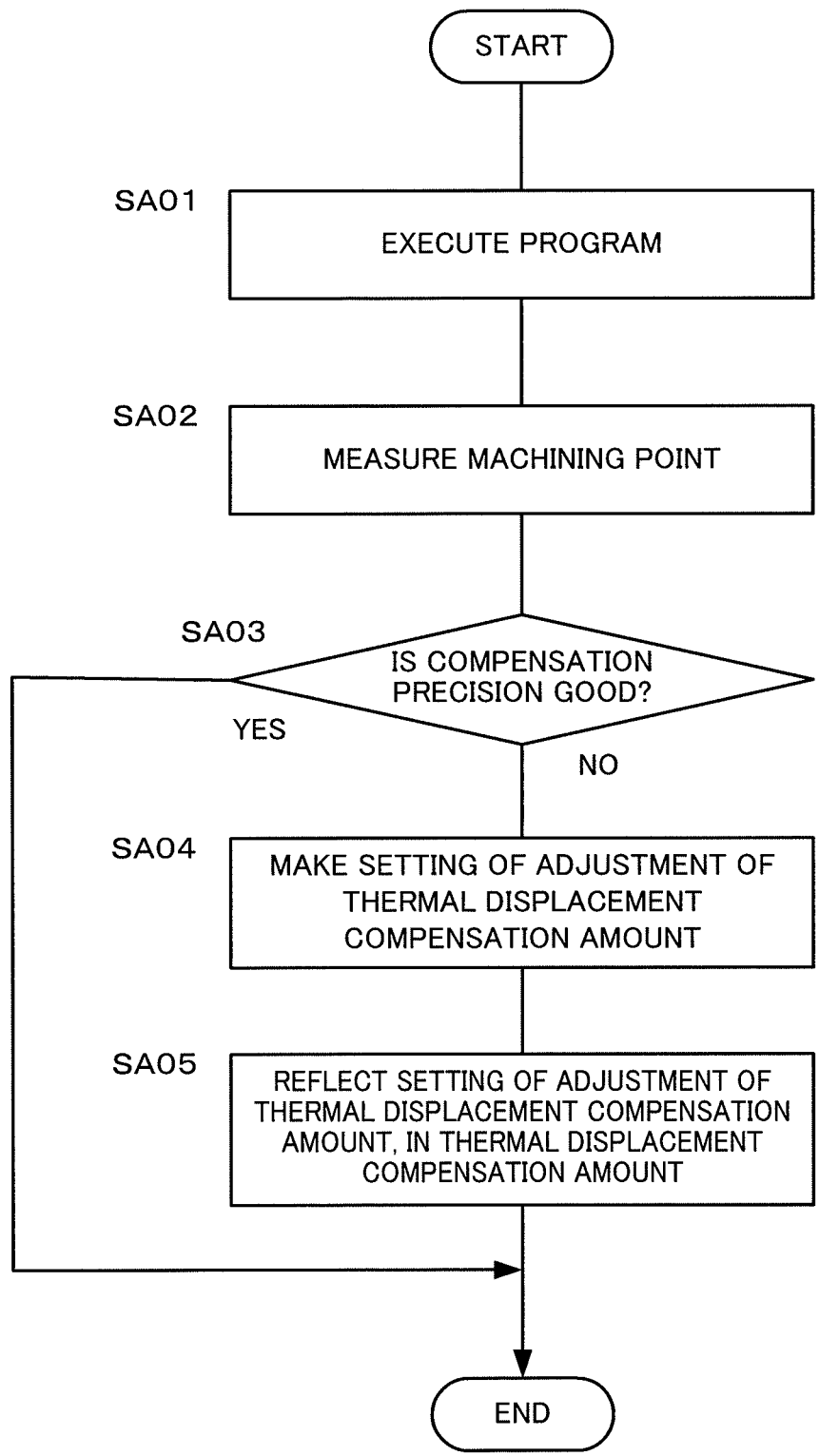
FIG. 4 is a flowchart for explaining procedures of adjustment of the thermal displacement compensation amount executed by the thermal displacement compensation device according to the present invention.

FIG. 4 is a flowchart illustrating process of adjustment of a thermal displacement compensation amount executed by the thermal displacement compensation device according to the present invention. Each step will be described below.

[Step SA01] A program of machining a work is executed using a thermal displacement compensation device (numerical controller).

[Step SA02] A position which serves as an indicator for specifying a position of a machining point, such as a machining surface of a workpiece or a fixed point on the table, is measured using a known measuring device after execution of the program, and a displacement amount (compensation error) of a machining point is obtained.

[Step SA03] Whether or not compensation precision of the compensation error obtained in step SA02 is good is checked, and, when the compensation precision is good (YES), this processing is finished, but when the compensation precision is not good (NO), processing proceeds to step SA04.

Figure 5:
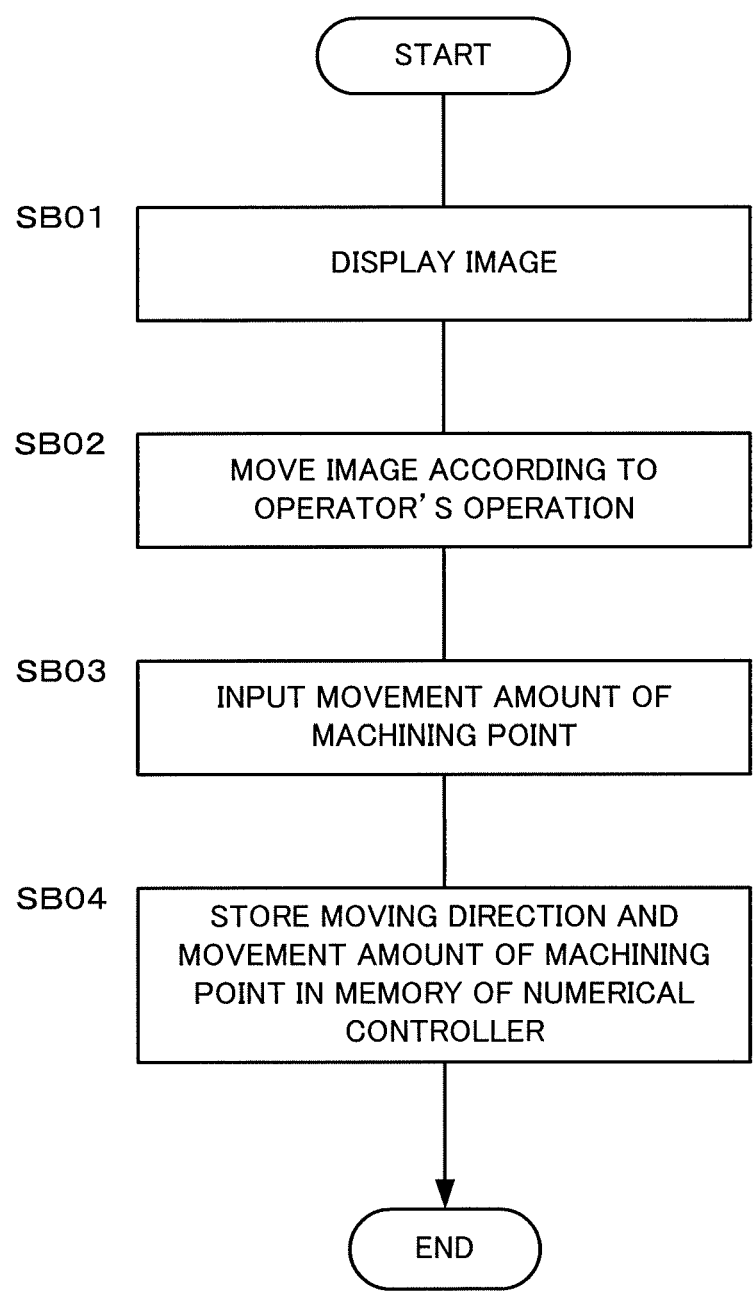
FIG. 5 is a flowchart for explaining a setting of adjustment of the thermal displacement compensation amount (in case of inputting the movement amount)

[Step SA04] A setting of adjustment of a thermal displacement compensation amount is made (see FIG. 5).

[Step SA05] The setting of adjustment of the thermal displacement compensation amount is reflected in the thermal displacement compensation amount (see FIG. 6), and this processing is finished.

Next, "setting of adjustment of a thermal displacement compensation amount" in step SA04 will be described. A method of setting adjustment of the thermal displacement compensation amount includes two methods of inputting a movement amount of a machining point (see FIG. 5), and calculating a movement amount of a machining point by operating an image (see FIG. 6).

<In a Case where a Movement Amount of Machining Point is Inputted (See FIG. 5)>

A workpiece image is displayed on the display device of the numerical controller 10 (the display device provided in the LCD/MDI unit 70). A movement amount of a machining point is set based on the compensation error measured in step SA02 (see reference numerals 108 and 116 in FIG. 2 and reference numerals 128 and 138 in FIG. 3).

In response to the operation of moving the machining point, the moving direction of the machining point is stored in the memory of the numerical controller. When an operation of moving the machining point in the positive direction is performed, the moving direction of the machining point is stored as the positive direction and, when an operation of moving the machining point in the negative direction is performed, the moving direction of the machining point is stored as the negative direction in the memory of the numerical controller.

According to an input from the operator (irrespectively of the inputting means), a value of the compensation error measured in step SA02 is set to the movement amount ($L_{adj}$) of the machining point, and is stored in the numerical controller (that is, an error amount of the machining point is set according to the input from the inputting means). In this case, the set movement amount of the machining point is displayed (see reference numerals 108 and 116 in FIG. 2 and reference numerals 128 and 138 in FIG. 3). In addition, when the same value as the value of the compensation error due to the number of digits which can be inputted to the input device cannot be inputted, almost the same value as the value of the compensation error is inputted.

Next, a setting of adjustment of a thermal displacement compensation amount (to input a movement amount) will be described using the flowchart in FIG. 5. Each step will be described below.

[Step SB01] An image is displayed.

[Step SB02] The image is moved according to an operator's operation.

[Step SB03] The movement amount of the machining point is inputted.

[Step SB04] The moving direction of the machining point and the movement amount are stored in the memory of the numerical controller.

<In a Case where a Movement Amount of Machining Point is Calculated by Operating Image (See FIG. 6)>

A workpiece or tool image is displayed on the display device of the numerical controller 10 (the display device provided in the LCD/MDI unit 70). Display positions of these images can be moved by an operator's specific operation (a cursor key input, a software key input, a dragging operation or the like). The movement amount of the machining point is set based on the compensation error measured in step SA02 (that is, the error amount of the machining point is calculated from the movement amount of the image and is set). The movement amount ($l_E$) of the machining point may be made variable by performing an operation once and, in this case, is changed by performing a specific operation (such as a software key input) or using a specific memory in the numerical controller 10.

The movement amount ($L_{adj}$) is updated at the same time as the operation of moving the machining point.

The movement amount ($L_{adj}$) of the machining point is calculated using following equation (5) every time the machining point is moved, and is stored in the memory of the numerical controller 10.

$$L_{adj} = L_{adj} + l_E \times d \qquad (5)$$

$L_{adj}$: Movement amount of machining point before operation is performed $l_E$: Movement amount to be increased or decreased by one operation d: Direction in which machining point is moved (+1 or −1)

The calculated "movement amount $L_{adj}$ of the machining point before operation is performed" is displayed, and an operation of moving the machining point is performed so as to achieve the measured compensation error. Every time the moving operation is performed, the sign of $L_{adj}$ is checked, and is stored in the memory of the numerical controller 10 as the moving direction of the machining point.

Figure 6:
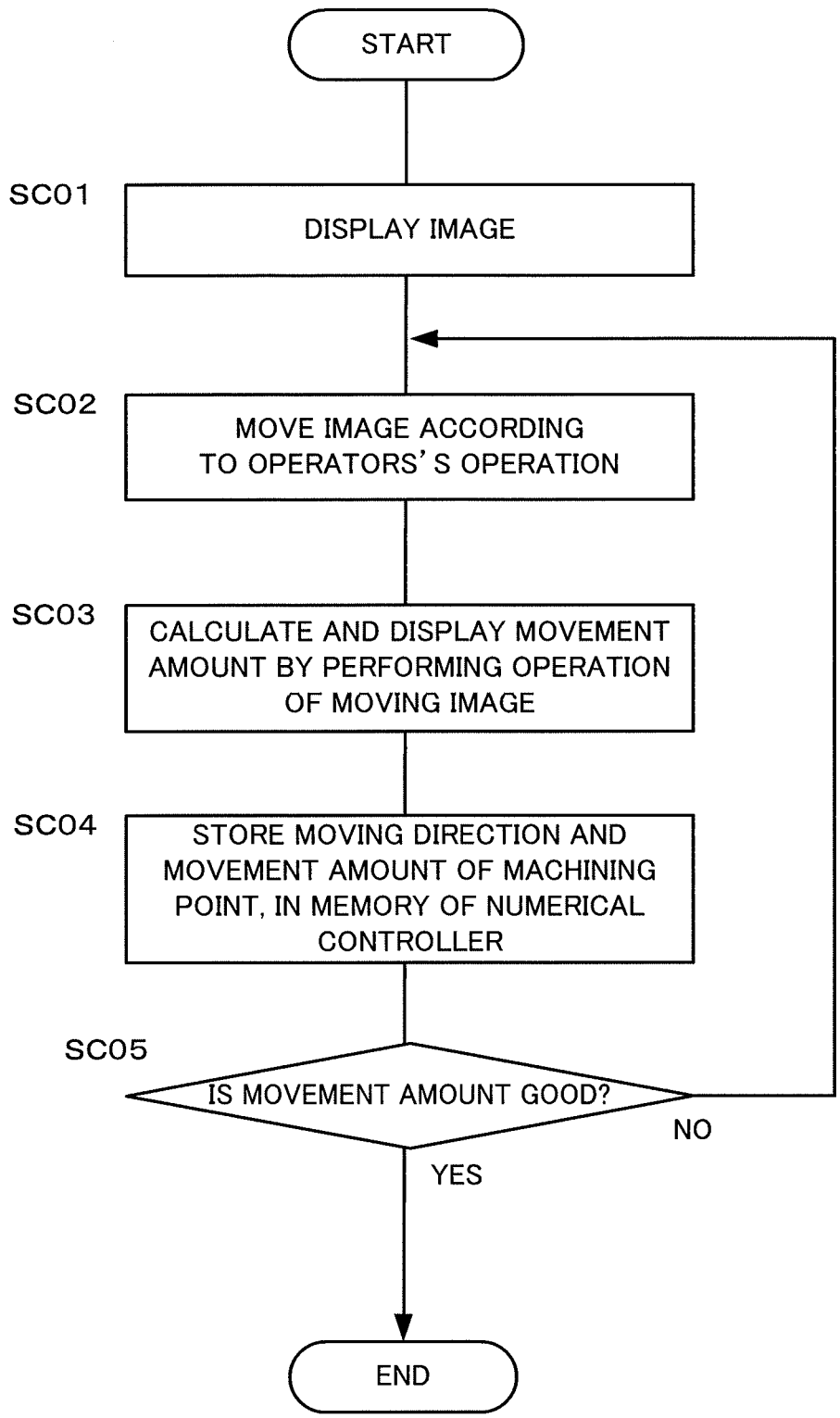
FIG. 6 is a flowchart for explaining a setting of adjustment of the thermal displacement compensation amount (in case of calculating the movement amount by operating an image)

Next, a setting of adjustment of a thermal displacement compensation amount (to calculate the movement amount by operating an image) will be described using a flowchart in FIG. 6. Each step will be described below.

[Step SC01] An image is displayed.

[Step SC02] The image is moved according to an operator's operation.

[Step SC03] The movement amount is calculated from the operation of moving the image, and is displayed.

[Step SC04] The moving direction and the movement amount of the machining point are stored in the memory of the numerical controller.

[Step SC05] Whether or not the movement amount calculated in step SC03 is good is checked, but when the movement amount is good (YES), this processing is finished, and, when the movement amount is not good (NO), the processing returns to step SC02.

Next, "reflection of setting of adjustment of the thermal displacement compensation amount in the thermal displacement compensation amount" in above step SA05 will be described. To adjust the thermal displacement compensation amount, "increase or decrease of a thermal displacement compensation amount" and "movement amount of a machining point" are obtained.

"movement amount of a machining point" is obtained by reading $L_{adj}$ stored in the memory of the numerical controller 10. Next, the moving direction of the machining point stored in the memory of the numerical controller 10 is read, and "increase or decrease of a thermal displacement compensation amount" is determined.

A thermal displacement compensation amount may be an amount of extension of a feed axis, not a movement amount of a machining point on a machine coordinate. In this case, the sign of a thermal displacement compensation amount does not correspond to the sign of a machine coordinate, and a fixed end of an axis and the direction of a machine coordinate differ depending on the machine tool or the axis. Hence, there are methods of compensating a thermal displacement compensation amount by adding the thermal displacement compensation amount to a position command value and compensating a thermal displacement compensation amount by subtracting the thermal displacement compensation amount from the position command value, and a method of determining "increase or decrease of a thermal displacement compensation amount" varies between these methods.

Then, determination of "increase or decrease of a thermal displacement compensation amount" is performed in a case where the thermal displacement compensation amount is added to a position command value and in a case where the thermal displacement compensation amount is subtracted from the position command value, separately.

When the thermal displacement compensation amount is compensated by adding the thermal displacement compensation amount to the position command value, if the moving direction of the machining point is positive direction, "increase of a thermal displacement compensation amount" is performed. Further, when the moving direction of the machining point is negative direction, "decrease of a thermal displacement compensation amount" is performed.

Meanwhile, when the thermal displacement compensation amount is compensated by subtracting the thermal displacement compensation amount from the position command value, if the moving direction of the machining point is positive direction, "decrease of a thermal displacement compensation amount" is performed. Further, when the moving direction of the machining point is negative direction, "increase of a thermal displacement compensation amount" is performed.

"increase or decrease of a thermal displacement compensation amount" determined as described above is stored in the memory of the numerical controller 10. Adjustment is performed according to each of the above adjusting methods based on "increase or decrease of a thermal displacement amount" and "movement amount of a machining point". Although both of "moving direction of a machining point" and "increase or decrease of a thermal displacement compensation amount" are stored in the memory of the numerical controller 10 in this example, one of these may be stored. When "moving direction of a machining point" is stored in the memory of the numerical controller 10, it is possible to determine "increase or decrease of a thermal displacement compensation amount" based on the determination content, and, when "increase or decrease of a thermal displacement compensation amount" is stored in the memory of the numerical controller 10, it is possible to determine "moving direction of a machining point" by reversing the determination content.

Next, reflecting a setting of adjustment of a thermal displacement compensation amount in the thermal displacement compensation amount will be described using a flowchart in FIG. 7. Each step will be described below.

[Step SD01] The movement amount of the machining point is read from the memory of the numerical controller.

[Step SD02] An increase or a decrease of the thermal displacement compensation amount is determined based on the moving direction of the machining point read from the memory of the numerical controller.

[Step SD03] The thermal displacement compensation amount is adjusted, and this processing is finished.

When adjusting a thermal displacement compensation amount using an increase or a decrease of the thermal displacement compensation amount and the movement amount of a machining point, the present invention can determine the increase or decrease of thermal displacement compensation amount based on the direction in which the image moves, and simply adjust the thermal displacement compensation amount without erroneously increasing or decreasing the thermal displacement compensation amount. By this means, the present invention can reduce a probability of erroneously setting an increase or decrease of thermal displacement compensation amount, as compared with conventional techniques.

The invention claimed is:

1. A thermal displacement compensation device of a machine tool, the thermal displacement compensation device comprising:

a thermal displacement compensating unit configured to compensate a position command value of a feed axis by predicting a thermal displacement amount of a part of the machine tool from an operation of the machine tool or a temperature of said part of the machine tool, and adding a thermal displacement compensation amount, which cancels the predicted thermal displacement amount, to the position command value of the feed axis;

a thermal displacement compensation amount adjusting unit configured to adjust the thermal displacement compensation amount from an error amount, said error amount being between the position command value compensated by the thermal displacement compensating unit and an actual machining point;

an image display device configured to display an image of a workpiece or a tool;

an image operating unit configured to move the image of said workpiece or tool in a direction to cancel the error amount of the machining point;

a moving direction display unit configured to display on the image display device an image which shows a relationship between an initial position of the image for which the thermal displacement compensation amount has not yet been adjusted and a position of the image which has been moved by the image operating unit;

a thermal displacement compensation amount determining unit configured to determine an increase or a decrease of the thermal displacement compensation amount based on the direction in which the image is moved from the initial position by the image operating unit, wherein the thermal displacement compensation amount determining unit is configured to determine the increase of the thermal displacement compensation amount when the direction in which the image is moved from the initial position by the image operating unit indicates that the machining point moves in a positive direction on a machine coordinate, and the thermal displacement compensation amount determining unit is configured to determine the decrease of the thermal displacement compensation amount when the direction in which the image is moved from the initial position by the image operating unit indicates that the machining point moves in a negative direction on the machine coordinate; and an error amount setting unit configured to set the error amount of the machining point, wherein the thermal displacement compensation amount adjusting unit is configured to adjust the thermal displacement compensation amount based on the increase or decrease of the thermal displacement compensation amount determined by the thermal displacement compensation amount determining unit and the error amount of the machining point set by the error amount setting unit, and wherein the machine tool is controlled based on the thermal displacement compensation amount adjusted by the thermal displacement compensation amount adjusting unit.

2. The thermal displacement compensation device according to claim 1, wherein the error amount setting unit is configured to set the error amount of the machining point according to an input from an inputting means.

3. The thermal displacement compensation device according to claim 1, wherein the error amount setting unit is configured to calculate and set the error amount of the machining point from a movement amount of the image.

4. The thermal displacement compensation device according to claim 1, further comprising:

a memory configured to store a program of measuring the initial position, a program of compensating thermal displacement executed by the thermal displacement compensating unit and the thermal displacement compensation amount adjusting unit, and a machining program for machining the workpiece by the machine tool.

5. The thermal displacement compensation device according to claim 4, wherein the memory is configured as a non-volatile memory backed up by a battery.

6. A method of adjusting a thermal displacement compensation amount for a machine tool by using a thermal displacement compensation device, the thermal displacement compensation device comprising:

a thermal displacement compensating unit configured to compensate a position command value of a feed axis by predicting a thermal displacement amount of a part of the machine tool from an operation of the machine tool or a temperature of said part of the machine tool, and adding a thermal displacement compensation amount, which cancels the predicted thermal displacement amount, to the position command value of the feed axis;

a thermal displacement compensation amount adjusting unit configured to adjust the thermal displacement compensation amount from an error amount, said error amount being between the position command value compensated by the thermal displacement compensating unit and an actual machining point;

an image display device configured to display an image of a workpiece or a tool;

an image operating unit configured to move the image of said workpiece or tool in a direction to cancel the error amount of the machining point;

a moving direction display unit configured to display on the image display device an image which shows a relationship between an initial position of the image for which the thermal displacement compensation amount has not yet been adjusted and a position of the image which has been moved by the image operating unit;

a thermal displacement compensation amount determining unit configured to determine an increase or a decrease of the thermal displacement compensation amount based on the direction in which the image is moved from the initial position by the image operating unit, wherein the thermal displacement compensation amount determining unit is configured to determine the increase of the thermal displacement compensation amount when the direction in which the image is moved from the initial position by the image operating unit indicates that the machining point moves in a positive direction on a machine coordinate, and the thermal displacement compensation amount determining unit is configured to determine the decrease of the thermal displacement compensation amount when the direction in which the image is moved from the initial position by the image operating unit indicates that the machining point moves in a negative direction on the machine coordinate; and an error amount setting unit configured to set the error amount of the machining point, wherein the thermal displacement compensation amount adjusting unit is configured to adjust adjusts the thermal displacement compensation amount based on the increase or decrease of the thermal displacement compensation amount determined by the thermal displacement compensation amount determining unit and the error amount of the machining point set by the error amount setting unit, the method comprising:

executing a program of machining the workpiece by the machine tool;

measuring the machining point after execution of the program and obtaining a compensation error of the machining point;

checking whether or not compensation precision of the compensation error obtained in the measuring satisfies a predetermined condition;

setting adjustment of the thermal displacement compensation amount depending on a result of the checking; and reflecting the adjustment of the thermal displacement compensation amount.

7. The method according to claim 6, wherein the setting of adjustment of the thermal displacement compensation amount comprises:

displaying an image;

moving the image according to an operator's operation;

inputting a movement amount of the machining point; and storing a moving direction of the machining point and the movement amount in a memory of a numerical controller of the machine tool.

8. The method according to claim 6, wherein the setting of adjustment of the thermal displacement compensation amount comprises:

displaying an image;

moving the image according to an operator's operation;

calculating a movement amount from the operation of moving the image, and displaying the movement amount as calculated;

storing a moving direction and the movement amount of the machining point in a memory of a numerical controller of the machine tool;

checking whether the movement amount calculated in the calculating satisfies the predetermined condition; and returning to the moving when a result of the checking indicates that the movement amount calculated in the calculating does not satisfy the predetermined condition.

9. The method according to claim 6, wherein the reflecting of the adjustment comprises:

reading a movement amount of the machining point from the memory of a numerical controller of the machine tool;

determining the increase or decrease of the thermal displacement compensation amount based on a moving direction of the machining point read from the memory of the numerical controller; and adjusting the thermal displacement compensation amount.

* * * * *